July 11, 1939.  L. W. BLAU ET AL  2,165,213

ELECTRICAL TRANSIENT WELL LOGGING

Filed April 8, 1936  4 Sheets-Sheet 1

Fig.-1

Ludwig W. Blau Inventor
Louis Statham
By P. L. Young Attorney

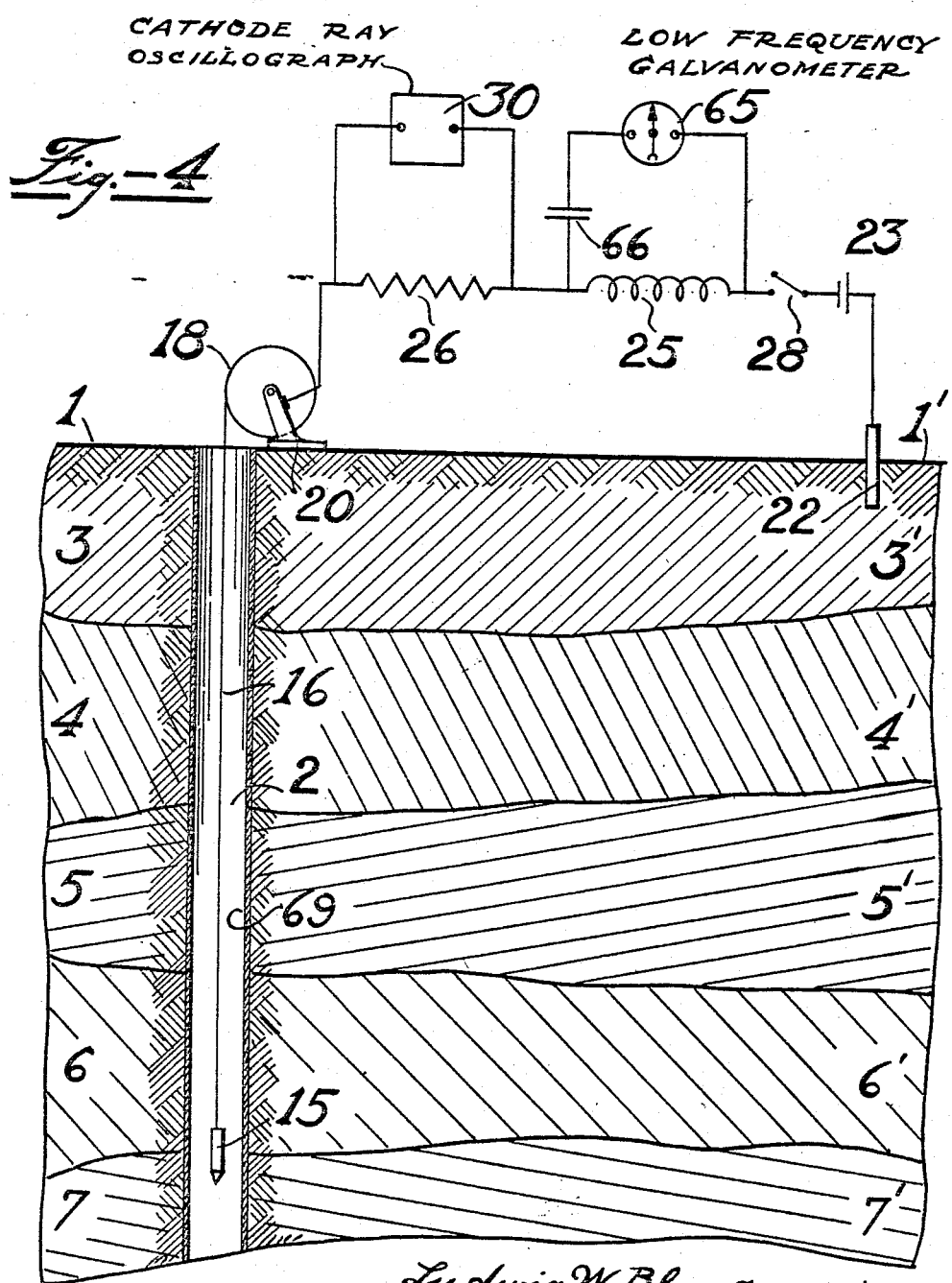

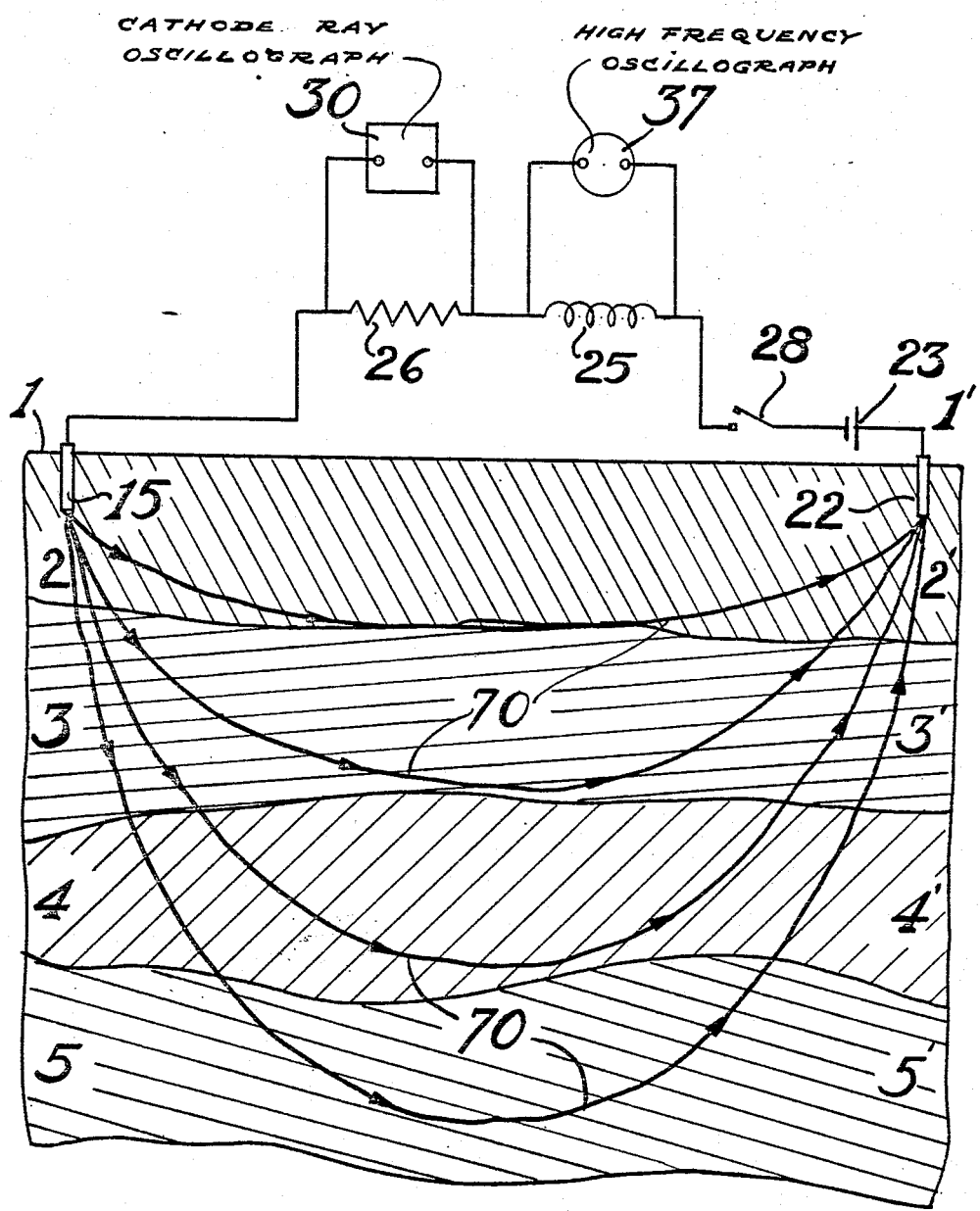

Patented July 11, 1939

2,165,213

UNITED STATES PATENT OFFICE 2,165,213

ELECTRICAL TRANSIENT WELL LOGGING

Ludwig W. Blau and Louis Statham, Houston, Tex., assignors to Standard Oil Development Company, a corporation of Delaware Application April 8, 1936, Serial No. 73,234

16 Claims. (Cl. 175—182)

This invention relates to an improved method and apparatus for observing the electrical characteristics of the earth. More particularly, it relates to improvements in determining the nature of the earth strata adjoining a well.

This invention is an improvement over the invention described in our copending application, Serial No. 759,510 entitled "Method and apparatus for recording earth current transients", filed December 28, 1934, now Patent No. 2,079,103 of May 4, 1937.

The invention will be fully understood from the following description read in connection with the accompanying drawings, in which latter—

Fig. 1 is a diagrammatic illustration of a preferred form of apparatus for carrying out the invention;

Fig. 4 is a diagrammatic illustration of a modified form of apparatus for carrying out the invention in which a low frequency galvanometer is used, and showing its application to a cased hole, and Fig. 5 is a diagrammatic representation of the invention as applied to use in surface prospecting.

Figure 3:
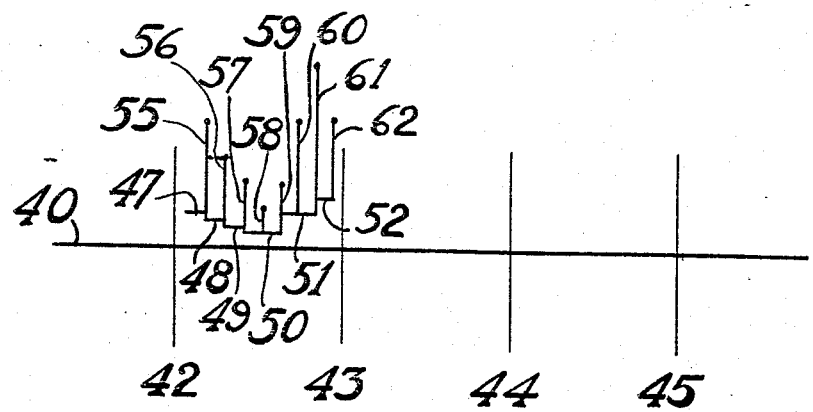
Fig. 3 is a diagram showing a typical record of a transient as observed with the high frequency oscillograph and using the circuit illustrated in Fig. 1.

Referring particularly to Fig. 1 of the drawings, reference numerals 1—1' designate the surface of the earth, and numeral 2 designates a bore hole in the earth. The bore hole 2 has penetrated through earth strata designated 3—3' to 7—7' inclusive respectively. In the embodiment illustrated, the bore hole 2 contains water or mud designated 11.

Apparatus is provided for determining the electrical characteristics of the earth strata traversed by the bore hole. The apparatus comprises an electrode 15 which is suspended in the well 2 by an insulated cable 16 of electrically conductive material. The water, drilling mud or the like 11 assures good contact electrically of the electrode 15 with the surrounding earth formations. Suitable means, such as a sheave 18, secured at the mouth of the bore hole 2 is provided over which the cable 16 passes for raising and lowering the electrode 15 in the well. The sheave 18 is supported for rotation by means of a bracket 20.

An electrode 22 is embedded in the ground at a substantial distance from the top of the bore hole 2. The electrode 22 may be a porous cup or a plurality of electrically conductive stakes which are embedded in the earth. Preferably, the earth around the electrode 22 is saturated with a solution of a suitable salt, such as copper sulphate, sodium chloride or any other suitable electrolyte.

An electric circuit connects the electrode 15 and its supporting cable 16 with the electrode 22. The circuit comprises a battery 23 or other source of direct current, which is connected in series with an inductance 25, a resistance 26, and a switch 28, which is normally held in open position by springs 29, to the electrodes 15 and 22. An indicating instrument is arranged in the circuit for receiving an indication of the transient of the direct current as modified by its passage through the earth. The indicating instrument is a cathode ray oscillograph 30, the horizontal deflecting plates of which are connected to the circuit in parallel with the resistance 26. The horizontal deflection plates of the cathode ray oscillograph 30 are connected across the resistance 26, the vertical deflection plates being connected to a suitable sweep circuit in the usual manner. The actual shape of the transient may be seen on the screen of the cathode ray oscillograph 30, and if desired the transient can be photographed in the usual way. The varying current from its zero value at the instant of closing the switch 28 to its steady value sometime afterwards, or any curve representing such current, is called a transient.

In the operation of the device for logging a well, the switch 28 is closed periodically to permit of the passing of an electric current through the earth between the electrodes 15 and 22. In practice, the switch 28 is closed approximately every six inches of travel of the electrode 15 in the bore hole 2. This is accomplished automatically in the embodiment illustrated by mounting the switch 28 on a support below the sheave 18. Rods 33 are mounted to protrude from the periphery of the sheave 18 at suitable distances, such as from three inches to one foot apart. The rods 33 close the switch 28 as the sheave 18 turns, while the cable 16 is being lowered and raised in the bore hole 2. When the switch 28 is closed, the electric current builds up in the cable 16 and through the ground from electrode 15 to electrode 22 at a rate and with an amplitude depending upon the electrical properties of the earth strata traversed by the drill hole. A potential difference up to about 500 volts is applied across the electrodes from the source of current 23. The rate of building up of the current is very sudden at first. The current is transmitted to the cathode ray oscillograph 30 connected in parallel with the resistance 26. The oscillograph is operated in the usual manner to give a curve indicating the current or potential, depending on whether the oscillograph is current or voltage sensitive.

Figure 2:
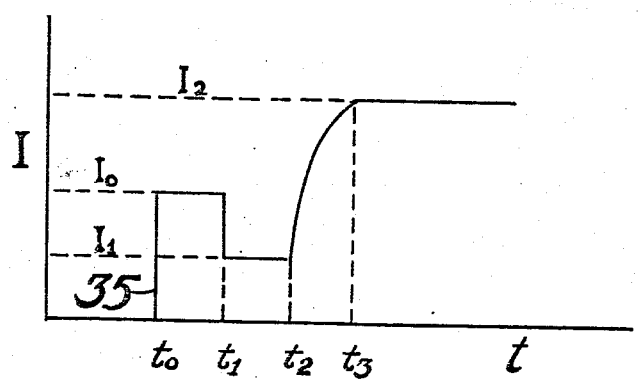
Fig. 2 is a diagram showing a typical record of a transient as observed in a cathode ray oscillograph and using the circuit illustrated in Fig. 1.

A transient as observed in the cathode ray oscillograph 30 is illustrated in Fig. 2, in which the current I is plotted along the axis of the ordinates and the time is plotted along the axis of the abscissae. In the record illustrated, the instant of closing the switch 28 is designated by the line 35 at its position at time $t_0$. The current rises instantaneously to a value $I_0$ as illustrated, this being the current determined by the iterative impedance of the cable 16. The current then remains constant at the value $I_0$, as illustrated, to the time $t_1$, at which time the reflection of the current from the electrode 15 has arrived back at the cathode ray oscillograph 30. The current then becomes altered to the value of $I_1$, which is determined by the terminal impedance of the cable 16. In the diagram illustrated, the value $I_1$ is nearer the axis of abscissae than the value current $I_0$. It will be understood, however, that the current $I_1$ may be higher than the current $I_0$. At the time $t_2$ the current is again altered to the value $I_2$ at the time $t_3$, the current $I_2$ being determined by the direct current resistance of the casing 69, when the reading is carried out in a cased hole as illustrated in Fig. 4. Now from time $t_2$ to time $t_3$ the current may rise instantaneously or more slowly, depending upon the electrical constants of the geological formations surrounding the drill hole. For instance, if the geological formation immediately surrounding the electrode 15 has a very high resistivity and a negligible distributed inductance and distributed capacity, the current will rise instantaneously at times $t_2$ to the steady state value $I_2$, provided the observations are being made in an uncased hole, as illustrated in Fig. 1. In a cased hole, the inductance effect of the casing 69 will be very high (as will be explained later) and the current will, therefore, rise to the steady value $I_2$ more slowly.

High frequency components of the transient are observed by means of a high frequency oscillograph or galvanometer 37 which is connected in parallel with the inductance 25.

When the switch 28 is periodically closed the electric current builds up in the circuit and through the ground from the electrode 15 to the electrode 22, at a rate and with an amplitude depending upon the electrical properties of the earth strata through which the current passes. It is characteristic of the transient obtained on passing an electric current through conductors of varying electrical properties that it has high frequency components. The rate of building up of the current is very sudden at first, so that the reactance of the inductance coil 25 is very high compared with the impedance of the high frequency oscillograph 37. The high frequency components of the transient are choked out, therefore, by the inductance 25 and flow through the oscillograph 37. On the other hand, the resistance to direct current of the inductance 25 is made low compared with the direct current impedance of the high frequency oscillograph 37, so that when the current has reached its steady value at the end of the transient state nearly all of the current will flow through the inductance 25.

Referring to Fig. 3, there is illustrated a record obtained with the high frequency oscillograph 37 in logging the uncased well illustrated in Fig. 1. In this record the line 40 designates the base line and the vertical lines 42 to 45 inclusive designate or correspond to the depths in the bore hole 2. Preferably these lines were photographed on the film of the oscillograph at the end of each 10 feet of travel of the electrode 15 in the bore hole 2. A high frequency oscillograph was used in order to obtain response to the high frequency components in the transient. The record illustrated was obtained with an oscillograph having a natural frequency of 10,000 cycles per second. Referring to the record, the steady state currents are indicated by the horizontal lines 47 to 52 inclusive. The value of these currents will depend on the resistance of the ground between the electrodes. Theoretical considerations and practical experience have established the fact that in a circuit having electrodes arranged as shown, the bulk of the drop in the circuit, say about 95%, occurs within a few feet of the electrodes. Since the drop at the surface electrode remains substantially constant about 95% of the change in the drop obtained by moving the electrode in the borehole from one position to the other will be accounted for by the change in the drop within a few feet of the borehole electrode. Consequently, the different values of the lines 47 to 52 inclusive are representative of the relative resistances of the substrata opposite the borehole electrode at the various recording times. The vertical lines, 55 to 62 inclusive, denote the high frequency components of the transients obtained each time the circuit is closed. The steepness of the transients and, consequently, the high frequency component of the transients is proportional to the reactance of the earth strata opposite the borehole electrode. Thus, the record produced by the arrangement described affords information concerning both the direct current resistance and the reactance of the substrata. A given substratum may have a high resistance and a high reactance, a low resistance and a high reactance, a high resistance and a low reactance, or any other combination of characteristics. It will be seen that the transient 55 gives a much greater deflection than, for instance, the transient 58, and that the transient 61 is greater than the transient 55. The steady state currents, as designated by lines 47 to 52 inclusive, vary with the transient amplitudes since the record was made with the electrode 15 disposed in an uncased hole.

Referring to Fig. 4, a modified form of the device is illustrated in which a low frequency galvanometer 65 is employed, connected in series with a condenser 66. A circuit, including the low frequency galvanometer 65 and the condenser 66, is connected in parallel with the inductance 25. In operating this form of the invention the charge in the circuit is measured as is done in electrical measurements when the capacity of a condenser is to be determined. In such a case an under-damped galvanometer, the period of which is long compared with the time of discharge of the condenser is employed. The deflections are then proportional to the charge on the condenser and the capacity can be calculated. In a quite similar manner, in the application of a low frequency galvanometer 65 to the circuit illustrated, the deflection of the galvanometer 65 will be proportional to the total current passing through the circuit in the form of the transient and the deflections of the galvanometer are, therefore, proportional to the impedance of the ground from the electrode 15 to the electrode 22.

In the embodiment illustrated in Fig. 4, a metallic casing 69 lines the bore hole 2. In measurements made in a cased hole the skin effect, which is very high in the relatively thin steel casing, offers an exceedingly high impedance to the passage of the rapidly varying initial part of the transient. The high frequency components of the transients, for this reason, do not flow upward in the casing 69 in appreciable intensity but traverse the geological formations lying between the electrode 15 and the electrode 22. Most of the potential drop occurs in the immediate vicinity of the electrode 15 in the bore hole 2, for instance 95% of the drop between the electrodes 15 and 22 occurs within approximately 2 feet of the electrode 15. Consequently, the transient as observed on the cathode ray oscillograph 30, or on the oscillograph 65, is affected or influenced almost exclusively by the formations immediately surrounding the well electrode 15. The resistance to direct current of the casing 69 lining the bore hole is very low, say less than $\frac{1}{10}$ ohm, and nearly all of the steady state current will, therefore, flow upward through the casing, so that when working in a cased hole the currents indicated by the horizontal lines 47 to 52 inclusive in Fig. 3, will have equal or very nearly equal amplitudes regardless of the geological formations traversed by the drill hole. In the embodiment illustrated in Fig. 4, the switch 28 is illustrated as being manually operated.

The apparatus described makes use of electrical transients in determining variations in the electrical properties of the earth strata traversed by a bore hole. The apparatus is applicable and equally satisfactory for use in uncased holes, cased holes or in logging continuously during the drilling operation. If desired, the drill bit used in drilling the bore hole may function as the electrode within the well.

The invention is equally applicable for use in determining the presence of valuable minerals, oil or other subterranean deposits in surface prospecting, in which case the electrodes 15 and 22 may be disposed in the earth's surface at a distance of from several hundred feet to a few miles apart, as is illustrated in Fig. 5. When the switch 28 is closed the current passing between the electrodes 15 and 22 builds up gradually, depending upon the electrical constants of the earth strata such as are designated 3—3', 4—4', etc., through which the electric lines of force, designated 70, pass. As the equipment is moved over the region to be tested, a number of records will be obtained showing at each location of test the number of earth strata of different electrical characteristics and the approximate thickness of such strata.

By the arrangement described, accurate records of the electrical properties of the earth strata traversed by a bore hole are obtained. The records obtained while the electrode 15 is being lowered into the well coincide with the records obtained when the electrode is being withdrawn upwardly through the well or bore hole 2. Consequently, the accuracy of the records is checked in a single operation.

Various changes and alternate arrangements may be made within the scope of the appended claims, in which it is our intention to claim all novelty inherent in the art as broadly as the prior art permits.

We claim:

1. The method of logging a well in earth strata of different electrical properties from each other between the terminals of an exploring circuit, which comprises moving one of the terminals along the well and grounding the other terminal at a distance from the well, passing an electric current through the circuit and the earth strata at a point of travel of said moving terminal whereby a transient is obtained which is modified by the passage through the strata of the current at said point of travel of said moving terminal, and exhibiting an indication of the transient of said current as modified by its passage through the strata upon an indicating instrument arranged in the circuit.

2. The method of exploring earth strata between the terminals of an exploring circuit, which comprises passing an electric current through a circuit including the earth strata whereby a transient is obtained having high frequencies modified by the passage of the current through the strata, and exhibiting an indication of the high frequencies upon an indicating instrument arranged in the circuit.

3. The method of exploring earth strata between the terminals of an exploring circuit, which comprises passing an electric current through a circuit including the earth strata whereby a transient is obtained having high frequencies, exhibiting an indication of the transient of said current as modified by its passage through the strata upon an indicating instrument arranged in the circuit, and exhibiting an indication of the high frequencies of the transient.

4. The method of logging a well having a metallic casing and disposed in earth strata of different electrical properties from each other between the terminals of an exploring circuit, which comprises disposing one of the terminals in the well and grounding the other terminal at a distance from the well, passing an electric current through the circuit including the casing and the earth strata whereby a transient is obtained having high frequencies modified by the passage of the current through the strata, and exhibiting an indication of the high frequencies upon an indicating instrument arranged in the circuit.

5. The method of logging a well having a metallic casing disposed in earth starta of different electrical properties from each other between the terminals of an exploring circuit, which comprises disposing one of the terminals in the well and grounding the other terminal at a distance from the well, passing an electric current through the circuit including the casing and the earth strata whereby a transient is obtained having high frequencies, exhibiting an indication of the transient of the current as modified by its passage through the strata upon an indicating instrument arranged in the circuit, and exhibiting an indication of the high frequencies of the transient as modified by the passage of the current through the strata.

6. Apparatus for logging a well in earth strata of different electrical properties from each other, comprising a circuit including an electrode at the surface of the earth spaced from the well electrically connected to an electrode in the well, a source of electric energy in the circuit whereby a transient is obtained having high frequencies, and an indicator in the circuit for exhibiting an indication of the frequencies of the transient of the current as modified by its passage through the strata.

7. Apparatus for logging a well in earth strata of different electrical properties from each other, comprising a circuit including an electrode at the surface of the earth spaced from the well electrically connected to an electrode in the well, a source of electric energy and an inductance connected in series with the electrodes whereby electric current is passed through the subsurace strata and a transient is obtained having high frequencies, and an indicator connected in parallel with the inductance in the circuit for exhibiting an indication of the frequency of the transient of the current as modified by its passage through the strata.

8. Apparatus for logging a well in earth strata of different electrical properties from each other, comprising a circuit including an electrode at the surface of the earth spaced from the well electrically connected to an electrode in the well, a source of electric energy in the circuit whereby a transient is obtained having high frequencies, an indicator in the circuit for exhibiting an indication of the transient of the current as modified by its passage through the strata, and an indicator in the circuit for exhibiting an indication of the frequencies of the transient of the current as modified by its passage through the strata.

9. Apparatus for logging a well in earth strata of different electrical properties from each other, comprising a circuit including an electrode at the surface of the earth spaced from the well electrically connected to an electrode in the well, a source of electric energy whereby a transient is obtained having high frequencies, a resistance and an inductance in the circuit, an indicator connected in parallel with the resistance for exhibiting an indication of the transient of the current as modified by its passage through the strata, and an indicator connected in parallel with the inductance for exhibiting an indication of the frequencies of the transient of the current as modified by its passage through the strata.

10. Apparatus for geophysical exploration, comprising means for passing an electric current through a given volume of the ground whereby a transient is obtained having high frequencies, and means for exhibiting a function of the frequencies of the transient of the current as modified by its passage through the ground.

11. Apparatus for geophysical exploration, comprising means for passing an electric current through a given volume of the ground whereby a transient is obtained having high frequencies, means for exhibiting a function of the transient of the current as modified by its passage through the ground, and an indicator associated with said exhibiting means for exhibiting a function of the frequencies of the transient of the current as modified by its passage through the ground.

12. An apparatus for geophysical exploration comprising a pair of electrically connected electrodes adapted to be grounded in the earth at a distance from each other, a source of electrical power in the circuit connecting said electrodes, an inductance connected in series with said electrodes and an electrical indicating instrument connected across said inductance.

13. An apparatus for geophysical exploration comprising a pair of electrically connected electrodes adapted to be grounded in the earth at a distance from each other, a source of electrical power in the circuit connecting said electrodes, an inductance connected in series with said electrodes, an electrical indicating instrument connected across said inductance and a condenser connected in series with said instrument.

14. An apparatus for geophysical exploration comprising a pair of electrically connected electrodes adapted to be grounded in the earth at a distance from each other, a battery in the circuit connecting said electrodes, a switch in the electrode circuit, an inductance connected in series to said electrode, and a high frequency oscillograph connected across said inductance.

15. An apparatus for geophysical exploration comprising a pair of electrically connected electrodes, a battery in the circuit connecting said electrodes, a switch in the electrode circuit, an inductance connected in series with said electrodes, a low frequency galvanometer connected across said inductance and a condenser connected in series with said galvanometer.

16. An apparatus for geophysical exploration comprising a pair of electrically connected electrodes adapted to be grounded in the earth at a distance from each other, a battery in the electrode circuit, a switch in the electrode circuit, an inductance and a resistance connected in series with each other and with the electrodes, a high frequency oscillograph connected across the inductance and a galvanometer connected across the resistance.

LUDWIG W. BLAU.
LOUIS STATHAM.